US012560096B2

(12) United States Patent
Riera et al.

(10) Patent No.: US 12,560,096 B2
(45) Date of Patent: Feb. 24, 2026

(54) STATOR PART HAVING A FIN, IN A TURBINE ENGINE

(71) Applicants: SAFRAN, Paris (FR); CENTRE NATIONAL DE LA RECHERCHE SCIENTIFIQUE (CNRS), Paris (FR)

(72) Inventors: William Henri Joseph Riera, Moissy-Cramayel (FR); Gabriel Jacques Victor Mondin, Moissy-Cramayel (FR); Xavier Jean-Pierre Ottavy, Boulogne-Billancourt (FR)

(73) Assignees: SAFRAN, Paris (FR); CENTRE NATIONAL DE LA RECHERCHE SCIENTIFIQUE (CNRS), Paris (FR)

(*) Notice: Subject to any disclaimer, the term of this patent is extended or adjusted under 35 U.S.C. 154(b) by 0 days.

(21) Appl. No.: 18/855,940

(22) PCT Filed: Apr. 7, 2023

(86) PCT No.: PCT/FR2023/050507
§ 371 (c)(1),
(2) Date: Oct. 10, 2024

(87) PCT Pub. No.: WO2023/198981
PCT Pub. Date: Oct. 19, 2023

(65) Prior Publication Data
US 2025/0327411 A1 Oct. 23, 2025

(30) Foreign Application Priority Data
Apr. 11, 2022 (FR) ....................................... 2203298

(51) Int. Cl.
*F01D 9/04* (2006.01)
*F01D 5/14* (2006.01)

(52) U.S. Cl.
CPC ............. *F01D 9/041* (2013.01); *F01D 5/146* (2013.01); *F05D 2240/12* (2013.01); *F05D 2240/80* (2013.01)

(58) Field of Classification Search
CPC ..... F01D 9/00; F01D 9/02; F01D 9/04; F01D 9/041; F01D 9/042; F01D 9/044;
(Continued)

(56) References Cited

U.S. PATENT DOCUMENTS

2017/0009781 A1* 1/2017 Maniere .................. F01D 5/146
2018/0017079 A1 1/2018 DiPietro, Jr. et al.
2018/0156239 A1* 6/2018 Zielinger .............. F04D 29/681

FOREIGN PATENT DOCUMENTS

FR 3 014 943 A1 9/2015
FR 3 063 118 A1 8/2018
(Continued)

OTHER PUBLICATIONS

French Search Report for International Application No. FR 2203298, dated Nov. 25, 2022.
(Continued)

*Primary Examiner* — Elton K Wong
(74) *Attorney, Agent, or Firm* — BIRCH, STEWART, KOLASCH & BIRCH, LLP

(57) ABSTRACT

The invention relates to a stator part (20) of a turbine engine, comprising a platform (22), a blade (24, 26) extending radially relative to a central axis (A), and a fin (28) extending radially from a fin root (44) to a fin tip (46), the fin comprising a lower side (48) and an upper side (50), each point (100) of the lower side or of the upper side defining a radial axis (Ar) passing through the point, each plane (Pr) that includes the radial axis defining a section (S) of the lower side or of the upper side, an angle defined in the plane between the root profile and a tangent to the section at an
(Continued)

intersection (104) of the section and of the root profile being less than or equal to 45 degrees, the section being located between the root profile and the tangent.

6 Claims, 3 Drawing Sheets

(58) Field of Classification Search
CPC .. F01D 5/146; F05D 2240/12; F05D 2240/80; F05D 2250/71; F04D 29/54; F04D 29/541; F04D 29/542; F04D 29/68; F04D 29/681
See application file for complete search history.

(56) References Cited

FOREIGN PATENT DOCUMENTS

| | | |
|---|---|---|
| WO | WO 2021/123098 A1 | 6/2021 |
| WO | WO 2021/148751 A1 | 7/2021 |

OTHER PUBLICATIONS

International Search Report for International Application No. PCT/FR2023/050507, dated Jun. 7, 2023, with English translation.

* cited by examiner

STATOR PART HAVING A FIN, IN A TURBINE ENGINE

FIELD OF THE INVENTION

The invention relates to stator parts of a turbine engine comprising a blade, such as a flow straightener located downstream of a compressor, and in particular a fixed-pitch straightener.

PRIOR ART

In an aircraft turbine engine, and in particular aircraft intended for the transport of passengers, it is the air propelled by a fan and combustion gases leaving the turbine engine through an exhaust nozzle which exert a reaction thrust on the turbine engine and, through it, on the aircraft. The circulation of the gases through the turbine engine is influenced by blading in rotation and fixed blading. The fixed or stator blading include in particular outlet guide vanes (or OGV), inlet guide vanes (or IGV) and variable stator vanes (or VSV). The straightener blades of an aeronautical gas turbine engine can each have two platforms (inner and outer) which are applied to the blading. There also exist unshrouded architectures comprising straightener blades which have only a single, inner platform. In any case, these straightener blades form rows of fixed blades which allow guiding the gas flow passing through the engine at an appropriate speed and angle.

Within a flow straightener comprising a plurality of fixed blades, the overall flow of the gases occurs between the blades in an upstream-downstream direction. It is known, however, that the zone of the blade root can be the site of secondary aerodynamic flows.

For each pair of blades facing one another, a pressure gradient between the pressure face (lower side) of the first blade and the suction face (upper side) of the second blade generates a crossflow which transports the gases toward the upper side.

At the end of the blade, i.e. at the junction between the blading and the hub or between the blading and the casing, a corner separation and a corner vortex can occur. This separation generates pressure loses as well as an aerodynamic blockage. The latter is problematic in terms of operability. For high angles of attack of the flow arriving on the straightener, i.e. when the direction of flow of the gases upstream of the straightener forms a large angle with a direction of the leading edge of the blade, this corner separation is amplified until it causes a separation of the boundary layer on the blade which can no longer provide deflection of the flow.

There is therefore a need for a new geometry allowing correcting these problems and improving the performance in terms of efficiency of the equipment, particularly at high angles of attack of the flow entering into the straightener.

DISCLOSURE OF THE INVENTION

One object of the invention is to propose a stator part of a turbine engine, the geometry of which improves the flow of fluids relative to the prior art.

The object is attained within the scope of the present invention by means of a stator part comprising:

- a platform defining a wall of a gas flow stream,
- a blade extending radially relative to a central axis of the turbine engine from the platform, and

- a fin extending radially into the stream from a fin root located on the platform to a fin tip, the fin comprising a lower side and an upper side located radially between the fin root and the fin tip,
- each point of the lower side or respectively of the upper side defining a radial axis passing through the point, each plane comprising the radial axis defining a section of the lower side or respectively of the upper side, an angle defined in the plane between the root profile and a tangent to the section at an intersection of the section and of the root profile being less than or equal to 45 degrees, the section being located between the root profile and the tangent.

A stator part of this type is advantageously and optionally completed by the following different features, taken alone or in combination:

- the platform is a first platform, the part comprising a second platform so as to define the flow stream between the first platform and the second platform, the stream extending radially over a stream height, the fin extending radially over a fin height, a ratio of the fin height to the stream height being greater than or equal to 0.01 and less than or equal to 0.25;
- the blade comprises a leading edge and a trailing edge separated by a blade chord, the fin comprising a plurality of radially stacked profiles between the fin root and the fin tip, each profile defining a chord between the leading edge of the fin and the trailing edge of the fin, the tip profile chord being less than the root profile chord; a ratio of the tip profile chord to the blade chord being greater than or equal to 0.1 and less than or equal to 0.6; a ratio of the root profile chord to the blade chord being greater than or equal to 0.3 and less than or equal to 1.1;
- each fin profile defines a maximum thickness of the profile between the lower side and the upper side in a direction perpendicular to the chord line, a ratio of the maximum thickness of the root profile to the root profile chord being greater than or equal to 0.05 and less than or equal to 0.25; and a ratio of the maximum thickness of the tip profile to the tip profile chord being greater than or equal to 0.05 and less than or equal to 0.25;
- the blade comprises a lower side facing the upper side of the fin, the fin comprising a trailing edge, the trailing edge comprising a trailing point located on the platform, a tangent to the trailing edge at the trailing point extending from the platform while separating itself from the axis between the blade and a radial tailing plane passing through the axis and the trailing point;
- the trailing edge comprises an asymmetry point so that for any current point of the trailing edge located between the asymmetry point and the trailing point, a tangent to the trailing edge at the current point extends from the trailing edge while separating itself from the axis between the blade and a radial trailing plane passing through the axis and the current point.

The invention also relates to a turbine engine comprising a stator part as was just presented and on an aircraft comprising a turbine engine of this type.

DESCRIPTION OF THE FIGURES

Other features and advantage of the invention will also be revealed by the description that follows, which is purely illustrative and not limiting, and must be read with reference to the appended drawings in which.

DETAILED DESCRIPTION OF THE INVENTION

Turbine Engine

Figure 1:
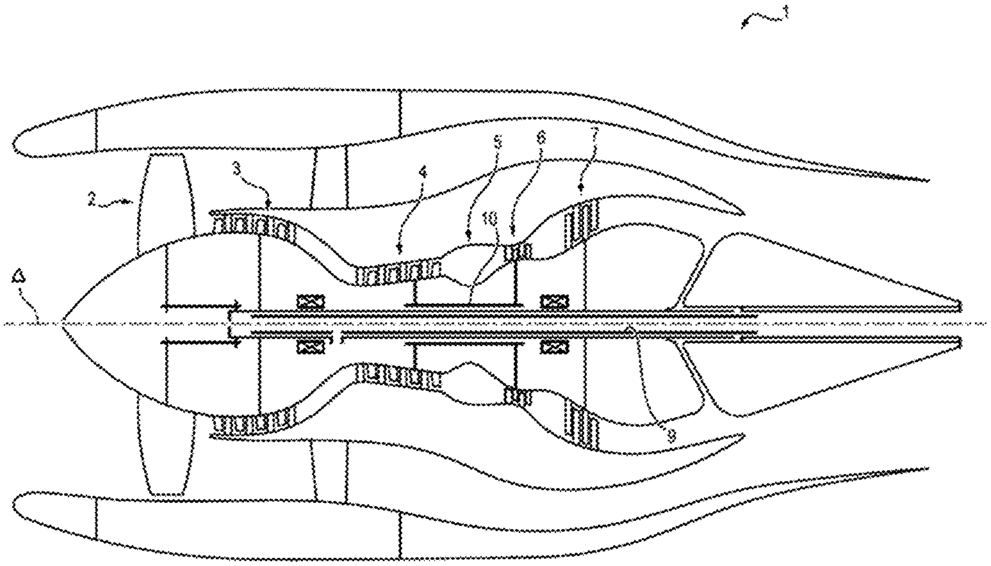
FIG. 1 is a schematic representation of a turbine engine.

Referring to FIG. 1, a turbine engine is shown schematically, more specifically a dual flow axial turbojet 1. The illustrated turbojet 1 extends along an axis Δ and includes successively, in the direction of flow of the gases in the turbine engine, a fan 2, a compression section which can comprise a low-pressure compressor 3 and a high-pressure compressor 4, a combustion chamber 5, and a turbine section which can comprise a high-pressure turbine 6, a low-pressure turbine 7 and an exhaust nozzle.

The fan 2 and the low-pressure compressor 3 are driven in rotation by the low-pressure turbine 7 by means of a first transmission shaft 9, while the high-pressure compressor 4 is driven in rotation by the high-pressure turbine 6 by means of a second transmission shaft 10.

During operation, a flow of air compressed by the low- and high-pressure compressors 3 and 4 supports combustion in a combustion chamber 5, the expansion of the combustion gases from which drives the high- and low-pressure turbines 6, 7. The air propelled by the fan 2 and the combustion gases leaving the turbojet 1 through an exhaust nozzle downstream of the turbines 6, 7 exert a reaction thrust on the turbojet 1 and, through it, on a vehicle or machine such as an aircraft (not illustrated).

Stator Part

Downstream of the fan or of a compression stage, the turbine engine can comprise a stage of straightening blades. A straightening blade stage of this type can comprise a stator part 20 as shown with reference to FIG. 2.

The stator part 20, or the assembly 20 of stator parts if it is not a single-piece design, has at least one blade 24, 26 and a platform 22 from which the blade 24, 26 extends. The stator part can for example comprise two adjacent blades 24, 26 which extend from the platform 22.

Here the term "platform" designates any element of the turbine engine from which blades 24, 26 are able to be mounted. The platform can in particular be a hub or a casing which surrounds the axis of the turbine engine. The platform can have a cylindrical surface with a constant radial distance from the axis Δ of the turbine engine. The platform 22 has an inner wall or an outer wall against which the air circulates, i.e. the platform 22 defines a wall of a gas flow stream. The blades 24, 26 extend from the platform 22 into the stream, either radially outward while separating themselves from the axis of the turbine engine Δ or radially inward while approaching the axis of the turbine engine Δ.

Figure 2:
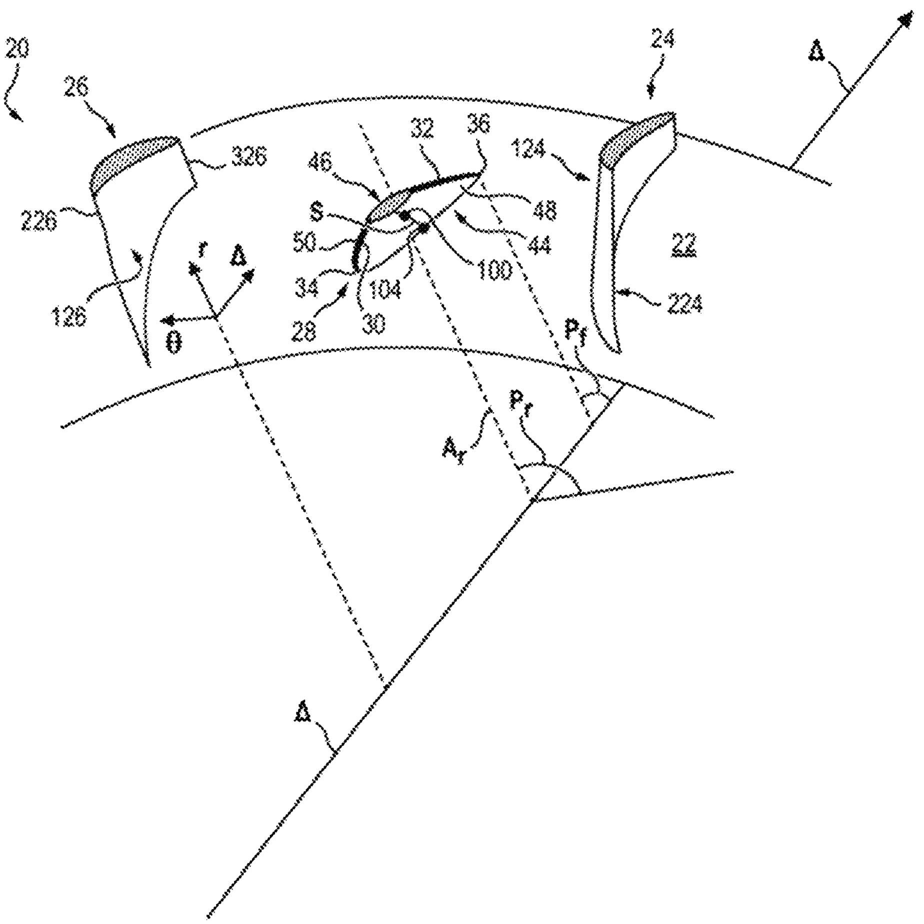
FIG. 2 is a schematic representation of a stator part according to a first embodiment.

FIG. 2 is a schematic representation of the stator part 20 in perspective. The axis Δ of the turbine engine is shown there oriented positively in the direction of the flow of the gases in the turbine engine. FIG. 2 also shows a radial axis r and a circumferential axis θ passing through a point 34 of the platform 22. At each point in space, and for example at a point 34 of the platform 22, a radial axis r can be defined which is perpendicular to the axis Δ of the turbine engine and which passes through the point and the axis Δ of the turbine engine. The radial axis is oriented positively in the direction which separates it from the axis Δ of the turbine engine. It is also possible to define a circumferential axis θ which passes through the point and which is perpendicular to the radial axis r and to the axis Δ of the turbine engine. The circumferential axis is oriented positively in the direction that separates it from the axis Δ of the turbine engine.

In the example of FIG. 2, the blades 24, 26 extend radially from the platform 22 while separating themselves from the axis of the turbine engine, but the invention is not limited to only this situation.

Figure 3:
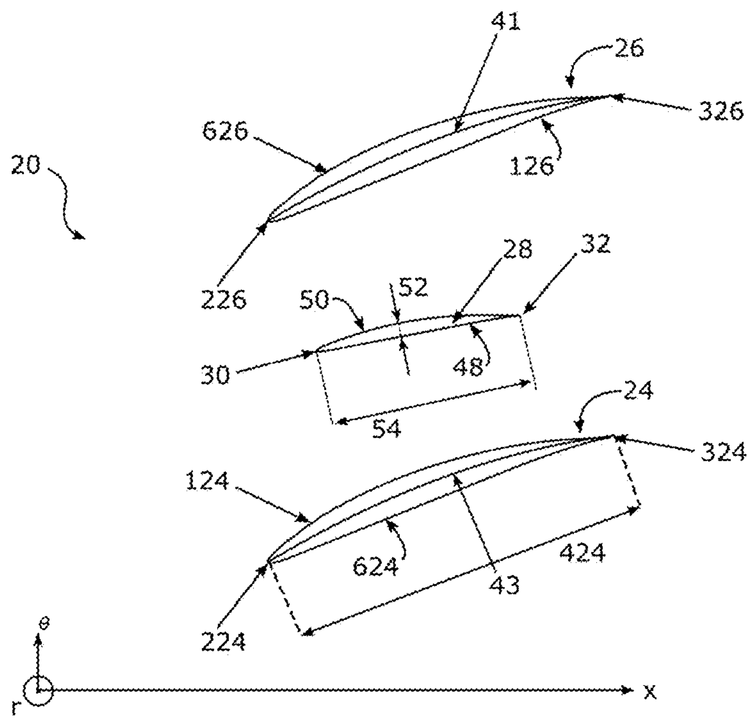
FIG. 3 is a schematic section view in a plane perpendicular to a radial axis of the turbine engine, of a stator part according to the first embodiment.

FIG. 3 is a schematic representation of the stator part 20 in a circumferential plane passing through the platform 22, a circumferential plane which is at a constant distance from the axis Δ of the turbine engine. Such a circumferential plane parallel to the axis Δ of the turbine engine allows defining a section of the blades 24, 26.

The direction of the axis Δ is given in FIG. 3 by the axis x, the orientation of which is the direction of flow of the gases. The radial axis r is perpendicular to the plane of FIG. 3 and directed toward the reader of FIG. 3. The axis θ corresponds to the circumferential direction, which is perpendicular simultaneously to the axis Δ and to the radial axis.

Each of the blades 24 and 26 has a lower side 624, 126 and an upper side 124, 626.

Each of the blades 24 and 26 comprises a leading edge 224, 226 on the upstream side and a trailing edge 324, 326 on the downstream side. The terms upstream and downstream are defined in relation to the general flow of the gases through the turbine engine, which occurs from upstream to downstream in the direction and the orientation of the axis Δ of the turbine engine.

The blades define a blade chord 424 which is the length of the segment connecting the leading edge and the trailing edge in a circumferential plane with a constant radius or at a constant distance from the axis Δ, a circumferential plane which can be qualified as a section plane.

Likewise, in a circumferential section plane, each blade has a camber line 43, 41 which is the curve equal to the mean of the upper side curve and the lower side curve. More precisely, the camber line is formed from all the points located at equal distance from the upper side and from the lower side. Here the distance from a particular point to the upper side (or from the lower side) is defined as the minimum distance between the particular point and a point of the upper side (or of the lower side).

Fin

The stator part 20 also comprises a fin 28 which extends from the platform 22 in the same direction and in the same extension orientation as the blade(s) 24, 26. The fin 28 extends into the stream radially relative to the axis Δ of the turbine engine from the platform 22.

The fin 28 comprises an upper side 50 which faces the lower side 126 of the blade 26.

When the part comprises two blades 24, 26, the fin 28 is located between the blades 24 and 26. More precisely, the fin 28 is located facing the upper side 124 of the first blade 24 and the lower side 126 of the second blade 26.

The fin 28 comprises a lower side 48 which faces the upper side 124 of the first blade and an upper side 50 which faces the lower side 126 of the second blade 26.

The fin 28 comprises a leading edge 30 and a trailing edge 32, the leading edge 30 being located upstream of the trailing edge 32.

The leading edge 30 comprises a leading point 34 located on the platform 22. The leading point 34 corresponds to the intersection of the leading edge 30 and the platform 22. A radial lading plane Pa is defined which passes through the axis Δ of the turbine engine and the leading point 34.

Any radial plane comprises the axis Δ of the turbine engine.

The trailing edge 32 comprises a trailing point 36 located on the platform 22. The trailing point 36 corresponds to the intersection of the trailing edge 32 and the platform 22. A radial trailing plane Pf is defined which passes through the axis Δ of the turbine engine and the trailing point 36.

Figure 4:
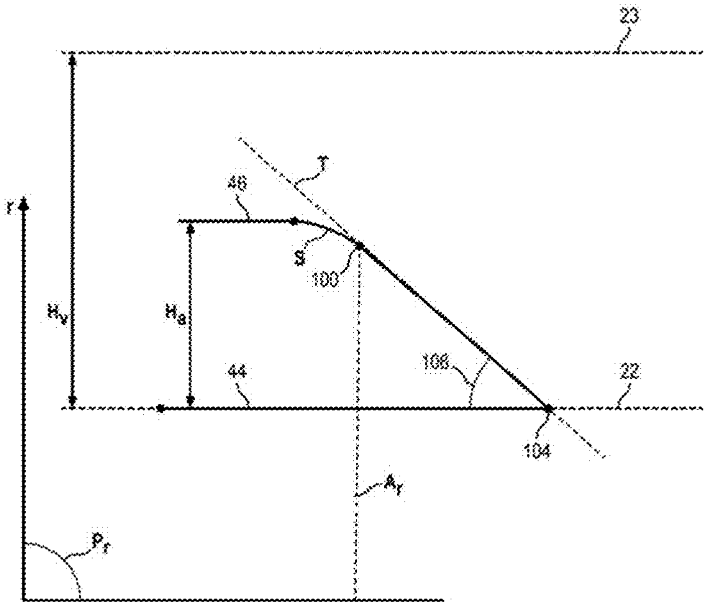
FIG. 4 is a schematic section view in a plane perpendicular to the axis of the turbine engine of a stator part according to the first embodiment.

FIG. 4 is a schematic representation in a plane Pr of certain parameters of the fin profile.

The most general embodiment of the invention corresponds to the following two features in relation to FIGS. 2 and 4.

Each point 100 of the lower side 48 of the fin 28 or respectively of the upper side 50 of the fin 28 defines a radial axis Ar passing through the point 100. The radial axis is orthogonal to the central axis Δ of the turbine engine and passes through the central axis Δ of the turbine engine.

Each plane Pr comprising the radial axis Ar defines a section S of the lower side 48 or respectively of the upper side 50.

The plane Pr is defined by the direction of the radial axis Ar and any other direction of the plane such as the circumferential direction, the direction of the central axis Δ of the turbine engine, or another direction. The plane Pr can be radial plane, or not.

In defining this plane Pr, a section plane of the lower side 48 is defined if the point 100 belongs to the lower side 48, or a section plane of the upper side 50 if the point 100 belongs to the upper side 50. The section plane then defines a section of the lower side 48 or of the upper side 50. The section S passes through the point 100 and through a point at the intersection 104 of the root profile 44 and of the lower side 48 or of the upper side 50. This point is also at the intersection 104 of the section S and of the root profile 44.

With reference to FIG. 4, an angle 106 is defined in the plane Pr between the root profile 44 and a tangent T to the section S, the tangent being constructed at the point at the intersection 104.

This angle 106 is less than or equal to 45 degrees.

In the plane Pr, the section S is located between the root profile 44 and the tangent T, i.e. each point of the section S defines a radial axis, and on this radial axis this point is located between a point of the root profile 44 and a point of the tangent T.

Any section S as defined above is located between the platform 22 and a tangent T as presented above. As the tangent is relatively close to the platform, in relation with the value of the angle 106, the fin has a stocky and pyramidal shape. This shape allows acting on:

- a first part of the crossflow upstream of the fin by guiding this first part without separation along the lower side of the fin, and on
- a second part of the crossflow which is closest to the blade of which the lower side faces the fin by confining this second part between the lower side of the blade and the upper side of the fin.

Corner separation is then strongly reduced.

Moreover, the upstream part of the fin has a relatively gentle slope relative to the platform 22. This reduces the risk of aerodynamic blockage even when this upstream part is located in the region of smallest section of the stream that is most subject to blockage. This is particularly advantageous at high Mach numbers where too great a solid blockage can induce shock waves.

The slow evolution of the height allows not causing the first part of the flow to separate: the gases follow the lower side of the fin and thus are guided to the trailing edge of the fin. The fact of guiding this first part of the crossflow can locally cancel the transverse pressure gradient, which limits the stalling of the stator blades.

It should be noted that if the point 100 is on the leading edge 30 or on the trailing edge 32 of the fin 28, the point 100 forms a part of both the lower side 48 and the upper side 50. The features presented above are then verified for the lower side and for the upper side.

FIG. 4 shows the situation where the section S comprises a point common to the tip profile 46, but this is not necessarily the case.

Fin Height

The platform 22 as described to the present defines an inner radial wall or respectively an outer radial wall of the gas flow stream.

When the stator part 20 corresponds to a shrouded structure, it comprises a second platform located radially facing the first platform 22, this second platform defining the radial outer wall or respectively the radial inner wall of the gas flow stream. The gas flow stream therefore passes radially between the first platform 22 and the second platform, the stream extending radially over a certain stream height designated by the label Hv in FIG. 4.

When the stator part 20 corresponds to an unshrouded architecture, it comprises only a single platform 22 defining the inner radial wall of the gas flow stream. The stream extends radially over a certain stream height defined by the height of the blades of the stator part 20, blades that protrude radially outward from the platform 22.

The fin 28 extends radially over a fin height Ha indicated in FIG. 4.

According to a first optional variant of the most general embodiment, a ratio of the fin height to the stream height being greater than or equal to 0.01 and less than or equal to 0.25.

It may be advantageous that the fin previously described remains of relatively low height so as not to block the stream.

Circumferential Fin-First Blade Distance

The first blade 24 and the second blade 26 are separated in a circumferential direction by a pitch 42. The pitch 42 which separates the blades is an angle separating a radial direction of the first blade 24 and a radial direction of the second blade 26. The pitch is fixed by the total number of blades playing the same role and having the same axial position as the blades 24 and 26, and which are located all around the axis Δ of the turbine engine. The distance separating the first blade 24 and the second blade is given by this angle and the radius to the axis Δ at which it is desired to evaluate this distance.

It is also possible to define an angle separating the first blade 24 and the fin 28 in the circumferential direction, or an angle separating a radial direction of the first blade 24 and a radial direction of the fin 28.

The angular separation of the first blade 24 and the fin 28 in the circumferential direction can be freely selected less than or equal to the angular pitch 42. In other words, the fin can be located between the first blade and the second blade at any distance from the first blade.

Fin Profiles

As previously seen, the first blade 24 defines a blade chord 424 between its leading edge 224 and its trailing edge 324.

It is possible to model or represent the fin 28 as a stack of profiles in a radial direction between a fin root 44 and a fin tip 46. The fin root 44 is located on the platform 22 and corresponds to the intersection of the fin 28 and the platform 22. The fin tip is located at a distance from the platform 22 in the gas flow stream. Each fin profile extends in a circumferential plane parallel to the axis Δ of the turbine engine, like a section of the fin produced in this circumferential plane with a constant radius or constant distance from the axis Δ, a circumferential plane which can be qualified as a section plane.

With reference to FIG. 3, each fin profile defines a fin chord 54 between the leading edge 30 of the fin and the trailing edge 32 of the fin. More precisely, the fin chord 54 is defined between, on the one hand, a first point at the intersection of the leading edge 30 and of the section plane, and on the other hand a second point at the intersection of the trailing edge 32 and the section plane. The fin chord designates the length of the segment connecting the first point and the second point. The chord line designates the segment connecting the first point and the second.

Each fin profile also defines a maximum thickness 52 between the lower side 48 of the fin and the upper side 50 of the fin in a direction perpendicular to the chord line.

Each fin profile allows defining a camber line which is the curve equal to the mean of the curve of the upper side 50 of the fin and the curve of the lower side 48 of the fin. More precisely, in a given profile of the fin, the camber line is formed of all the points located at equal distance between, on the one hand, the intersection of the upper side 50 and the section plane and, on the other hand, the intersection of the lower side 48 and the section plane. The camber line of the fin can be selected close to the camber line of the first blade 24.

The fin has a continuous variation of the profiles in the radial direction, i.e. all the parameters of camber, chord, and thickness vary continuously from the root profile to the tip profile.

A second optional variant of the most general embodiment and/or of its variant comprises the following three features:

- the tip profile chord is less than the root profile chord;
- a ratio of the tip profile chord to the blade chord is greater than or equal to 0.1 and less than or equal to 0.6;
- a ratio of the root profile chord to the blade chord is greater than or equal to 0.3 and less than or equal to 1.1.

The root profile chord is then relatively large, which allows blockage of the crossflow over a large part of the length of the blade chord.

A third optional variant of the most general embodiment and/or of its variants comprises the following two features:

- a ratio of the maximum thickness of the root profile to the root profile chord is greater than or equal to 0.05 and less than or equal to 0.25; and
- a ratio of the maximum thickness of the tip profile to the tip profile chord being greater than or equal to 0.05 and less than or equal to 0.25.

The fin is then relatively thick, which facilitates its manufacture and its mechanical strength, particularly in the case of particle or foreign body ingestion by the engine.

"Metal" Angles of the Fin and of the First Blade

It is possible to define, for the first blade 24 and the second blade 26:

- a metal blade leading angle as the angle between the tangent at the camber line to the leading edge of the blade and the axis Δ of the turbine engine, the angle being oriented from the axis Δ toward the tangent, and
- a metal blade trailing angle as the angle between the tangent to the camber line at the trailing edge of the blade and the axis Δ, the angle being oriented from the axis Δ to the tangent.

For each fin profile, it is possible to define:

- a metal fin leading angle as the angle between the tangent 61 to the camber line at the leading edge of the fin and the axis Δ of the turbine engine, the angle being oriented from the axis Δ toward the tangent 61, and
- a metal fin trailing angle as the angle between the tangent 63 to the camber line at the trailing edge of the fin and the axis Δ, the angle being oriented from the axis Δ to the tangent 63.

In the particular case of the fins described in this invention, it is possible to choose to estimate the metal angles as a function of the local camber angle of the blade 24 or 26.

For this purpose, it is possible to associate, with each point of each camber line of each fin profile, an axial position and a radial position. The fin point is associated with a reference point of a camber line 43 of a profile of the first blade 24, the reference point having the axial position and the radial position of the fin point.

It is possible to associate, with the metal fin leading angle, the local camber angle which is the angle oriented from the axis Δ to the tangent to the camber line of the profile of the first blade 24 at the associated reference point. It is possible to describe the metal fin leading angle with reference to this local camber angle as the difference between this metal angle and this local camber angle.

It is possible to associate, with the metal leading fin angle, the local camber angle which is the angle oriented from the axis Δ to the tangent to the camber line of the profile of the first blade 24 at the associated reference point. It is possible to describe the metal fin trailing angle with reference to this local camber angle as the difference between this metal angle and this local camber angle.

Generally, the fins described in this invention have, at the leading edge and at the trailing edge of the tip profile and of the root profile, metal angles close to the local camber angle. More precisely:

- the angle formed by a first tangent to the camber line of the fin tip profile at the leading edge 30 and by a second tangent to the camber line of the profile of the first blade at the reference point associated with the leading edge of the fin tip profile is less than or equal in absolute value to 10 degrees;
- the angle formed by a third tangent to the camber line of the fin tip profile at the trailing edge 32 and a fourth tangent to the camber line of the profile of the first blade at the reference point associated with the trailing edge of the fin tip profile is less than or equal in absolute value to 10 degrees;
- the angle formed by a fifth tangent to the camber line of the fin root profile at the leading point 34 and a sixth tangent to the camber line of the first blade profile at the reference point associated with the leading point 34 is less than or equal in absolute value to 10 degrees; and
- the angle formed by a seventh tangent to the camber line of the fin root profile at the trailing point 36 and an eighth tangent to the camber line of the profile of the first blade at the reference associated with the trailing point 36 is less than or equal in absolute value to 10 degrees.

The tip profile and the root profile then have a metallic angle at the trailing edge, the value of which is close to the local camber of the blades. In this manner, the fin guides the flow at the trailing edge like the blades.

Axial Position of the Fin Relative to the First Blade

To characterize the position of the fin in the direction of the axis Δ of the turbine engine, an axial coordinate of a mid-chord point of a fin profile is used.

The mid-chord point is located at equal distance from the leading edge 30 of the fin and from the trailing edge 32 of the fin.

The axial coordinate of the mid-chord point can be selected greater than or equal to an axial position of the leading edge 224 of the first blade and less than or equal to a sum of the axial position of the leading edge of the first blade and of the blade chord 424.

In particular, it is possible to use, as a mid-chord point, the mid-chord point of the fin tip profile.

The fin root profile, for its part, is positioned axially relative to the tip profile due to the stacking law of the fin which gives the relative positioning of the fin tip profile relative to the fin root profile.

For this relative positioning, the mid-chord point is selected as the positioning reference of each profile of the stack. Two axes are defined:

- a first axis "t" directed in the chord direction of the root profile and oriented in the same direction as the axis Δ of the turbine engine from upstream to downstream;
- a second axis "n" perpendicular to the first axis "t" and oriented in the same direction as the circumferential axis θ of the first blade 24 toward the second blade 26.

Two angles are defined:

- a sweep angle which is the angle between the axis "t" and a direction defined by the mid-chord point of the root profile and the mid-chord point of the tip profile;
- a lean angle which is the angle between the axis "n" and the direction defined by the mid-chord point of the root profile and the mid-chord point of the tip profile.

In the particular case of the fins described here, the sweep and lean angles, as have just been defined, taken on values greater than or equal to −10 degrees and less than or equal to +10 degrees. These angles are sufficiently low that the axial position of the fin is considered well described by an axial coordinate 78 of a mid-chord point 76 of a fin profile.

Positive Lean Effect at the Trailing Edge

A second embodiment depending on the most general embodiment or on its first variant comprises the following feature.

The fin 28 has a tangent at the trailing edge 32 at the trailing point 36 which extends into the stream from the platform 22 between the second blade 26 and the radial trailing plane Pf. In other words, in a radial plane orthogonal to the axis Δ of the turbine engine and passing through the trailing point, the tangent to the trailing edge while separating from the platform 22 on the stream side of the platform approaches the second blade 26. Formulated in yet a different manner, the trailing edge 32 is inclined at the trailing point 36 toward the second blade 26. It should be noted that, moreover, this tangent to the trailing edge can have a nonzero projection along the axis Δ of the turbine engine.

The inclination toward the second blade on the trailing edge side allows a lean effect at the trailing edge which more effectively blocks the crossflow. This allows avoiding that the crossflow originating from the second blade 26 goes up the upper side of the fin 28 and passes beyond the fin to join the lower side of the first blade 24. The fin is therefore "laid down" on the trailing edge side so as to present a wall sloping toward the lower side of the second blade 26. This is the positive lean effect. The crossflow is thus strongly driven back toward the lower side of the second blade 26.

It should be noted that the fin can have a trailing edge 32 which is straight and thus conflated with the tangent to the trailing edge 32 at that trailing point 36.

Positive Lean Effect Downstream of a First Asymmetry Point of the Trailing Edge

More generally, the fin 28 can comprise an asymmetry point and the following feature: at any current point of the trailing edge located between this asymmetry point and the trailing point 36, the tangent to the trailing edge which extends into the stream from the platform 22 is located between the second blade 26 and a radial plane passing through the current point. In other words, in a radial plane passing through the current point, the trailing edge, while separating itself from the current point toward the asymmetry point, approaches the second blade 26. Formulated in yet a different manner, the trailing edge 32 is inclined between the trailing point 36 and the asymmetry point toward the second blade 26.

The trailing edge upstream of the asymmetry point can, for its part, be symmetrical, i.e. each tangent to the trailing edge is contained in a radial plane which comprises the axis of the turbine engine.

The leading edge can also be symmetrical, i.e. each tangent to the leading edge is contained in a radial plane which comprises the axis of the turbine engine.

In this situation, the fin can be qualified as symmetrical upstream of the asymmetry point, and asymmetrical downstream.

Positive Lean Effect Downstream of a Second Asymmetry Point of the Leading Edge

When the asymmetry point is located on the tip profile, this asymmetry point can be a first asymmetry point and the fin can comprise a second asymmetry point, comprised this time on the leading edge.

At any current point of the leading edge located between this asymmetry point and the tip profile, the tangent to the leading edge which extends into the stream from the leading edge is located between the second blade 26 and the radial plane passing through the current point. In other words, in a radial plane passing through the current point, the trailing edge, while separating itself from the current point toward the tip profile, approaches the second blade 26. Formulated in yet a different manner, the leading edge 30 is inclined between the second asymmetry point and the tip profile toward the second blade 26.

The fin can then be qualified as symmetrical upstream of the second asymmetry point, and asymmetrical downstream. Possibly, the second asymmetry point can be the leading point 34 to which the entire fin can be qualified as asymmetrical.

The invention claimed is:

1. A stator part of a turbine engine comprising:

- a platform defining a wall of a gas flow stream,
- a blade extending from the platform radially relative to an axis of the turbine engine, and
- a fin extending from the platform radially into the stream, the fin comprising a fin root located on the platform and a fin tip, the fin comprising a lower side and an upper side, the lower side and the upper side being located between the fin root and the fin tip,
- the lower side comprising lower side points,
- for each lower side point, a lower side radial axis passing through the lower side point and the axis of the turbine engine, the lower side radial axis being orthogonal to the axis of the turbine engine, each lower side axis defining lower side planes, each lower side plane comprising the radial axis, and defining a section of the lower side, a profile of the fin root and the section of the lower side intersecting at a lower side intersection point, the profile of the fin root being a root profile, a lower side tangent being tangent to the section of the lower side at the lower side intersection point, the lower side section being located between the root profile and the lower side tangent, a lower side angle defined in the lower side plane between the root profile and the lower side tangent being less than or equal to 45 degrees, the upper side comprising upper side points, for each upper side point, an upper side radial axis passing through the upper side point and the axis of the turbine engine, the upper side radial axis being orthogonal to the axis of the turbine engine, each upper side axis defining upper side planes, each upper side plane comprising the upper side radial axis, and defining a section of the upper side, the root profile and the section of the upper side intersecting at an upper side intersection point, an upper side tangent being tangent to the section of the upper side at the upper side intersection point, the section of the upper side being located between the root profile and the upper side tangent, an upper side angle defined in the upper side plane between the root profile and the upper side tangent being less than or equal to 45 degrees, wherein the blade comprises a leading edge and a trailing edge separated by a blade chord, the fin comprising a plurality of fin profiles stacked in a radial direction between the root profile located at the fin root on the platform and a tip profile located at the fin tip, each fin profile defining a fin chord between a leading edge of the fin and a trailing edge of the fin, a fin chord of the tip profile being less than a fin chord of the root profile, a ratio of the fin chord of the tip profile to the blade chord being greater than or equal to 0.1 and less than or equal to 0.6;

a ratio of the fin chord of the root profile to the blade chord being greater than or equal to 0.3 and less than or equal to 1.1, wherein each fin profile defines a maximum thickness of the fin profile between the lower side and the upper side in a direction perpendicular to the chord of the fin profile, a ratio of a maximum thickness of the root profile to the chord of the root profile being greater than or equal to 0.05 and less than or equal to 0.25; and a ratio of a maximum thickness of the tip profile to the chord of the tip profile being greater than or equal to 0.05 and less than or equal to 0.25.

2. The stator part according to claim 1, wherein the platform is a first platform, the part comprising a second platform, the gas flow stream being defined between the first platform and the second platform, the gas flow stream extending radially over a stream height, the fin extending radially over a fin height, a ratio of the fin height to the stream height being greater than or equal to 0.01 and less than or equal to 0.25.

3. The stator part according to claim 1, wherein the blade comprises a blade lower side facing the upper side of the fin, the fin comprising a trailing edge, the trailing edge comprising a trailing point located on the platform, a trailing edge tangent being tangent to the trailing edge at the trailing point, a part of the trailing edge tangent extending from the platform away from the axis of the turbine engine, the part of the trailing edge tangent being located between the blade and a radial trailing plane passing through the trailing point and the axis of the turbine engine.

4. The stator part according to claim 3, wherein the trailing edge comprises an asymmetry point, so that for any current point of the trailing edge located between the asymmetry point and the trailing point, a current tangent being tangent to the trailing edge at the current point, a part of the current tangent extends from the trailing edge away from the axis, the part of the current tangent being located between the blade and a radial current plane passing through the axis and the current point.

5. A turbine engine comprising a stator part according to claim 1.

6. An aircraft comprising a turbine engine according to claim 5.

* * * * *